United States Patent Office 3,247,088
Patented Apr. 19, 1966

3,247,088
ISOMERIZATION OF TRANS POLYMERS OF CONJUGATED DIENES BY HIGH ENERGY PARTICLE RADIATION
Herbert R. Anderson, Jr., Bartlesville, Okla., assignor to Phillips Petroleum Company, a corporation of Delaware
No Drawing. Filed July 11, 1961, Ser. No. 123,110
10 Claims. (Cl. 204—154)

This invention relates to the isomerization of trans-1,4-structures in polymers of conjugated dienes to cis-1,4-structures by subjecting them to high energy particle radiation.

It is well known that butadiene may be polymerized by means of certain catalyst systems to produce polymers containing varying proportions of 1,4-structures in both cis and trans configurations.

I have made the surprising discovery that polybutadiene containing unsaturation of the trans-1,4 type may be isomerized by exposure to an intense electron beam, and at least a portion of the trans-1,4-structures are isomerized to cis-1,4-structure. Based on thermodynamic calculations, isomerization is expected to occur from cis to trans, but under my recited conditions the reverse conversion is achieved. It is recognized that such polymers have excellent properties for certain applications. For example, cis-polybutadiene exhibits very low heat buildup under conditions of flexure.

However, trans-polybutadiene can be extruded more easily than cis-polybutadiene, thus extruded and formed shapes can be produced more easily from trans-polybutadiene than from cis-polybutadiene. One can then convert these extruded shapes to high cis-polybutadiene content by operating according to the process of this invention.

In accordance with the present invention, formed samples of vulcanized polybutadiene having a major portion of trans-1,4-structures, and certain minimum dimensions, are exposed to an intense high energy beam while maintained in an inert atmosphere. While the precise reasons for this phenomenon cannot be given, it is postulated that the high temperatures generated inside the formed samples favor the isomerization in the desired direction. It thus appears that the formed samples must be of sufficient size to retain the heat generated by high energy bombardment for a sufficiently long time to effect melting of the interior of said formed sample.

The high energy beam required in this invention comprises one of a number of sub-atomic particles, e.g., alpha particles, protons, and electrons.

Accelerated electrons preferred for the process of this invention are those with an energy of at least 1 million electron volts (mev.), and ranging as high as 1 billion electron volts (bev.). Accelerated electrons for the purposes of this invention can be obtained from any convenient source, such as a linear accelerator, a Van de Graaff generator, a betatron, or a cyclotron, as is well known to those skilled in the art. The beam current may be varied from 0.1 to 1000 microamperes for a period of time ranging from about 0.5 to 60 minutes.

If heavier and more highly charged particles than electrons are used as the source of high energy radiation, their higher energy will permit isomerization of formed samples having less than the minimum dimension required for electron irradiation. The energies and beam currents set forth for electrons are applicable to the heavier particles. By way of support for this disclosure, there are listed below the linear energy transfer characteristics of charged, energetic particles initially having 1 mev. energy.

Particle:                    Electron-volts per angstrom
    Alpha _____ 20
    Proton _____ 3.3
    Electron _____ 0.012

It appears that a minimum dimension normal to the high energy beam of about 0.05 inch is necessary to attain the internal generation of a sufficiently high temperature by high energy irradiation to effect significant isomerization. A preferred minimum dimension is about 0.25 inch where alpha particles and protons are employed, while about 0.5 inch minimum is preferred where employing an electron beam for purposes of isomerization.

The temperature of irradiation is generally on the order of $-100$ to $+300°$ F. The desired temperature can be maintained by conventional means, such as a bath of the inert atmosphere, heated by an oven, adjacent hot plate, and the like. A group of fluids suitable for use as the inert atmosphere includes nitrogen, argon, water, and hydrocarbons that remain liquid at the temperature range of irradiation.

A preferred feature of the inert atmosphere in which the formed samples are immersed is that it be liquid at the temperature of irradiation. Thus, in liquid phase operation, sensible heat can be removed more readily. Among the suitable hydrocarbons are benzene, toluene, n-heptane, and the like. For example, if water and normally liquid hydrocarbons are employed, the irradiation temperature should preferably be below their boiling point, or the pressure can be increased to keep in liquid phase. It should be noted that hydrocarbons are the less preferred since they have a tendency to swell the rubbery formed samples.

The predominantly trans-1,4 polymers which are isomerized to predominantly cis-1,4 polymers by the process of this invention are vulcanized or gamma ray irradiated prior to electron bombardment. Vulcanization can be effected by conventional methods, e.g., heating with sulfur and an accelerator, or if desired, gamma irradiation of the unvulcanized rubber can be used to obtain the desired amount of cross-linking. Other methods such as peroxide vulcanization can be used if desired. As shown hereinafter in the examples, the presence of sulfur and/or sulfur compounds in the rubber during electron bombardment serves to accelerate the isomerization process.

If sulfur vulcanization is used, the rubber can be compounded with sulfur and conventional vulcanization accelerators and vulcanized by heating to 250–400° F. for from 15 to 60 minutes.

Irradiation with gamma rays can be carried out by irradiating the rubber at a dose rate of from $1 \times 10^3$ to $3 \times 10^7$ roentgens per hour at a temperature of from 0 to 150° F. for a sufficient length of time to obtain a total dose of from $1 \times 10^5$ to $5 \times 10^8$ roentgens equivalent physical (rep.).

Numerous sources of gamma rays for irradiation of the formed samples are available. Such sources as spent fuel elements from nuclear reactors are quite satisfactory and may be very economically used, for these are ordinarily allowed only to deteriorate in activity and then reprocessed for recovery of the fissionable material. By using these spent fuel elements in this process, the radiant energy available as gamma rays is put to use in vulcanizing rubbery polymers. Other sources of gamma rays, of course, may be utilized, for example, radioactive materials such as cobalt-60, and similar radioactive materials. Any other suitable source can be used. I employed as my gamma ray source a linear accelerator employing a tungsten target interposed between the electron beam and formed sample to convert electrons to gamma rays.

The percentage of trans structures in the formed sample to be subjected to the method of this invention is not critical. Obviously, if a rubbery polymer is relatively high in cis content, there would be only slight utility in subjecting it to the present novel isomerization process. For this reason, we prefer to isomerize formed samples of vulcanized rubbery polymers of conjugated dienes wherein at least 50 percent of the unsaturation is of the trans-1,4 type.

While this invention is particularly applicable to the isomerization of trans-polybutadiene, it is broadly applicable to the isomerization of trans polymers of conjugated dienes; for example, other polymers which can be isomerized are trans-polyisoprene, trans-poly(2,3-dimethyl butadiene); trans-polypiperylene, and the like.

EXAMPLE I

A polybutadiene rubber having a trans-1,4 content of about 93.5 percent, a Mooney viscosity (ML–4) of about 20, an inherent viscosity of 1.65, and a melting point of 183° F., was prepared by solution polymerization of butadiene in n-hexane diluent at 122° F., using a catalyst system comprising lithium aluminum hydride and titanium tetraiodide. Spheres of the resulting polybutadiene 0.5 inch in diameter were prepared from the solutions by conventional means.

The resulting spheres were irradiated with gamma rays to a total dosage of about $1 \times 10^7$ roentgens.

The irradiated spheres of predominantly trans-polybutadiene were next subjected to electron bombardment according to the present invention. The samples were first immersed in boiling water maintained at 100° C. Sufficient time was permitted to elapse in order to allow the crystalline phase to melt before exposure to the electron beam. The several samples were exposed to a beam current ranging between 150 and 500 microamperes over a time period ranging from one to six minutes at a beam energy of 6 mev. The resulting structures of the formed samples are tabulated below:

*Electron irradiation of trans-1,4-polybutadiene spheres at 100° C.*

| Sample | Dosage | | | Percent of total unsaturation for each isomer [a] | | |
|---|---|---|---|---|---|---|
| | Beam Current, μ amps | Time, min. | Pulse Rate, p.p.s. | Trans-1,4, percent | Cis-1,4 [b], percent | Vinyl, percent |
| 1 | 0 | 0 | 0 | 93.5 | | |
| 2 | 500 | 1 | 360 | 7.9 | 89.6 | 2.5 |
| 3 | 500 | 3.5 | 360 | 9.6 | 88.0 | 2.4 |
| 4 | 150 | 4 | 120 | 7.5 | 90.4 | 2.1 |
| 5 | 150 | 6 | 120 | 4.5 | 94.3 | 1.2 |

[a] The spheres prior to irradiation had a total unsaturation of about 95.9 percent of the theoretical. After irradiation, the total unsaturation was determined as about 91.9 percent of the theoretical. These determinations were made by the iodine chloride method.
[b] These values obtained by subtraction of the sum of trans-1,4 and vinyl content from 100.

It was noted that higher electron dosages caused a decrease in molecular weight of the iosmerized product. One can avoid this decrease in molecular weight by employing lower electron dosages, or, if desired, one can vulcanize the isomerized samples by means of gamma rays and the like. By employing this process, one can achieve extruded or formed shapes of cis-polybutadiene, yet can retain the advantage of the higher extrudability of trans-polybutadiene.

The spheres were observed during electron irradiation via closed circuit television. During this period, the spheres had a hard outer crust, which was probably attributable to the cooling effect of the surrounding boiling water. The cores of the spheres appeared molten probably due to internal heat generation by electron excitation. When the hard outer crust "exploded" or broke, the irradiation was terminated and spheres removed for conventional analysis by infrared for isomer content, and also for total unsaturation using the iodine chloride method.

EXAMPLE II

Another batch of polybutadiene was prepared exactly as previously described in connection with Example I. However, this batch was compounded according to the compounding recipe given below and then formed into 0.5 inch spheres.

*Compounding recipe*

| Ingredient: | Parts by weight |
|---|---|
| Trans-1,4-polybutadiene | 100 |
| Zinc oxide | 3 |
| Stearic acid | 2 |
| Antioxidant [1] | 1 |
| Sulfur | 1.75 |
| Vulcanization accelerator [2] | 1.6 |

[1] The antioxidant used was Flexamine, which is a mixture containing 65 percent by weight of a complex diarylamine-ketone reaction product and 35 percent by weight of N,N'-diphenyl-p-phenylenediamine.
[2] N-oxydiethylene-2-benzothiazyl sulfenamide.

The compounded spheres were cured by heating for 30 minutes at 307° F.

The sulfur-vulcanized spheres were then subjected to the electron beam exposure as previously described. Visual observations indicated that the isomerization of the predominantly trans-1,4-structure took place at a rate ten times more rapidly than when initially vulcanized with gamma rays. It was also noted that a decrease in molecular weight of the polymer occurred during irradiation. The conclusion as to the accelerating action of the sulfur-containing recipe was based on observing the time of occurrence of the "explosion" of the sphere crusts.

While the invention has been described in conjunction with present preferred embodiments, it should be apparent that it is not limited thereto.

I claim:

1. A method for isomerizing trans-1,4-structures in polymers of conjugated dienes to cis-1,4-structures which comprises: exposing to high energy sub-atomic particle irradiation a solid vulcanized rubbery polymer of conjugated dienes containing unsaturation of the trans-1,4 variety, said irradiation having a current ranging from 0.1 to 1,000 microamperes and an electron voltage ranging from 1 mev. to 1 bev., at a temperature ranging from about −100 to +300° F., while surrounded by an inert atmosphere, said rubbery polymer having its dimension which is normal to the radiation beam sufficiently large to retain the heat generated by high energy bombardment and sufficiently long to convert at least a portion of the trans-1,4-structures to cis-1,4-structures.

2. A method for isomerizing trans-1,4-structures in polybutadiene to cis-1,4-structures which comprises: exposing to electron beam irradiation a solid vulcanized rubbery polymer of polybutadiene wherein at least a major portion of the unsaturation is of the trans-1,4 variety, said beam having a current ranging from 0.1 to 1,000 microamperes and an electron voltage ranging from 1 mev. to 1 bev., at a temperature ranging from about −100 to +300° F., while surrounded by an inert atmosphere, said rubbery polymer having its dimension which is normal to the radiation beam sufficiently large to retain the heat generated by electron bombardment and sufficiently long to convert at least a portion of the trans-1,4-structures.

3. The method according to claim 2 wherein said rubbery polymer is vulcanized prior to electron irradiation by heating in the presence of sulfur compounds for about 15 to 60 minutes at 250° to 400° F.

4. The method of claim 2 wherein said rubbery polymer is irradiated by exposure to gamma rays to a total dosage of approximately $1 \times 10^5$ to $5 \times 10^8$ roentgens equivalent physical prior to electron irradiation.

5. The method of claim 2 wherein said inert atmosphere is selected from the group of fluids consisting of nitrogen, argon, water, and hydrocarbons that remain liquid at the temperature range of irradiations.

6. The method of claim 2 wherein said smallest dimension is about 0.5 inch.

7. A method for isomerizing trans-1,4-structures in polybutadiene to cis-1,4-structures which comprises: irradiating a solid rubbery polymer of butadiene by exposure to gamma rays to a total dosage of about $1 \times 10^5$ to $5 \times 10^8$ roentgens equivalent physical; irradiating the resulting vulcanized solid rubbery polymer while surrounded by an inert atmosphere by exposure to an electron beam of a current ranging from 0.1 to 1,000 microamperes and of an energy ranging from 1 mev. to 1 bev. for a period of time ranging from about 0.5 to 60 minutes, and at a temperature ranging from about $-100$ to $+300°$ F., said vulcanized solid rubbery polymer containing trans-1,4-structures and said exposure to said electron beam converting at least a portion of said trans-1,4-structures to cis-1,4-structures.

8. A method for isomerizing trans-1,4-structures in polybutadiene to cis-1,4-structures which comprises: vulcanizing a solid rubbery polymer of butadiene by heating in the presence of sulfur compounds for about from 15 to 60 minutes at 250 to 400° F.; irradiating the resulting solid vulcanized rubbery polymer while surrounded by an inert atmosphere by exposure to an electron beam of a current ranging from 0.1 to 1,000 microamperes and of an energy ranging from 1 mev. to 1 bev. for a period of time ranging from about 0.5 to 60 minutes, and at a temperature ranging from about $-100$ to $+300°$ F., said vulcanized rubbery polymer containing trans-1,4-structures and said exposure to said electron beam converting at least a portion of said trans-1,4-structures to cis-1,4-structures.

9. The method of claim 7 wherein the smallest dimension of said formed sample is about 0.5 inch.

10. The method of claim 8 wherein the smallest dimension of said formed sample is about 0.5 inch.

References Cited by the Examiner
UNITED STATES PATENTS 2,979,445  4/1961  Lavigne et al. _____ 204—154

OTHER REFERENCES

Golub: J. Am. Chem. Soc., vol. 80 (1958), pp. 1794–98; vol. 81 (1959), pp. 54–58.

SAMUEL H. BLECH, *Primary Examiner.*

MURRAY TILLMAN, *Examiner.*